US009442964B2

(12) United States Patent
Cornish et al.

(10) Patent No.: US 9,442,964 B2
(45) **Date of Patent: *Sep. 13, 2016**

(54) CONFORMING DATA STRUCTURE INSTANCES TO SCHEMA VERSIONS

(71) Applicant: International Business Machines Corporation, Armonk, NY (US)

(72) Inventors: Stephen Cornish, Waterlooville (GB); Daniel S. Pollitt, Eastleigh (GB); Stephen P. Rowles, Basingstoke (GB)

(73) Assignee: International Business Machines Corporation, Armonk, NY (US)

( * ) Notice: Subject to any disclaimer, the term of this patent is extended or adjusted under 35 U.S.C. 154(b) by 67 days.

This patent is subject to a terminal disclaimer.

(21) Appl. No.: 14/606,272

(22) Filed: Jan. 27, 2015

(65) Prior Publication Data

US 2015/0269198 A1 Sep. 24, 2015

Related U.S. Application Data

(63) Continuation of application No. 14/220,636, filed on Mar. 20, 2014.

(51) Int. Cl.

*G06F 17/30* (2006.01)
*G06F 17/22* (2006.01)
*G06F 17/24* (2006.01)

(52) U.S. Cl.

CPC ..... *G06F 17/30309* (2013.01); *G06F 17/2247* (2013.01); *G06F 17/30292* (2013.01); *G06F 17/30911* (2013.01); *G06F 17/30917* (2013.01); *G06F 17/241* (2013.01)

(58) Field of Classification Search

CPC .................... G06F 17/3023; G06F 17/30309; G06F 17/30551; G06F 17/30548

See application file for complete search history.

(56) References Cited

U.S. PATENT DOCUMENTS

| | | | | |
|---|---|---|---|---|
| 6,119,130 | A | 9/2000 | Nguyen et al. | |
| 7,177,875 | B2 | 2/2007 | Howard et al. | |
| 7,395,271 | B2 | 7/2008 | Idicula et al. | |
| 2005/0187973 | A1* | 8/2005 | Brychell, III | G06F 17/30917 |
| 2006/0294159 | A1* | 12/2006 | Dettinger | G06F 17/3092 |
| 2008/0082560 | A1 | 4/2008 | Agrawal et al. | |

(Continued)

OTHER PUBLICATIONS

Cobena et al, "Detecting Changes in XML Documents", 2002 IEEE, Proceedings of the 18th International Conference on Data Engineering (ICDE'02), pp. 41-52.*

(Continued)

*Primary Examiner* — Rehana Perveen
*Assistant Examiner* — Alexander Khong
(74) *Attorney, Agent, or Firm* — Edward J. Wixted, III

(57) ABSTRACT

In a method for managing versions of a schema, a processor receives a first version of a schema. A processor generates an annotated version of the first version of the schema, wherein one or more fields of the annotated version of the first version of the schema each correspond to a distinct identifier. A processor receives a first instance conforming to the first version of the schema. A processor identifies one or more values of the first instance, wherein each value of the one or more values corresponds to a field of the one or more fields. A processor assigns an identifier to at least one value of the one or more values based on the distinct identifier corresponding to the field of the at least one value. A processor stores the at least one value, such that the at least one value is associated with the assigned identifier.

7 Claims, 7 Drawing Sheets

550

(56) References Cited

U.S. PATENT DOCUMENTS

| | | | |
|---|---|---|---|
| 2008/0301168 | A1 | 12/2008 | Adler et al. |
| 2011/0035417 | A1 | 2/2011 | Cohen et al. |
| 2011/0184990 | A1 | 7/2011 | Murphy et al. |
| 2011/0252073 | A1 | 10/2011 | Pauly |

OTHER PUBLICATIONS

Gao et al, "W3C XML Schema Definition Language (XXSD) 1.1 Part 1: Structures", Copyright 2012 W3C, retrieved on Nov. 26, 2013 from website: <http://www.w3.org/TR/xmlschema 11-1>.

Hartung et al, "Recent Advances in Schema and Ontology Evolution", Chapter 6, published in Z. Bellahsene et al (eds.), "Schema Matching and Mapping", Data-Centric Systems and Applications, Copyright Springer-Verlag Berlin Heidelberg 2011, pp. 149-188.

Lerner, "A Model for Compound Type Changes Encountered in Schema Evolution", University of Massachusetts—Amherst Computer Science Department Faculty Publication, 2000 Computer Science Department Faculty Series, Paper 27.

Quin et al., "Extensible Markup Language (XML)", Copyright 1996-2003 W3C, retrieved from website: <http://www.w3.org/XML/>.

Ram et al., "Research issues in database schema evolutions: the road not taken", Working Paper #2003—15, Boston University School of Management, Department of Information Systems, Boston, MA, 2003.

Velegrakis et al., "Perserving mapping consistency under schema changes", Published online: Aug. 12, 2004, Copyright Springer-Verlag 2004.

U.S. Appl. No. 14/220,636, filed Mar. 20, 2014; Entitled "Conforming Data Structure Instances to Schema Versions".

Cobena, et al.; "Detecting Changes in XML Documents"; Proceedings of the 18th International Conference on Data engineering (ICDE '02); © 2002; 12 pages.

* cited by examiner

510

520

515

| Person Schema | Field identifiers |
|---|---|
| <xs:schema xmln:xs="http://www.w3.org/2001/XMLSchema"> | |
| <xs:element name="person" type="PersonType" /> | F1 |
| <xs:complexType name="PersonType"> | |
| <xs:sequence> | |
| <xs:element name="name" type="xs:string" /> | F2 |
| <xs:element name="phone" maxOccurs="unbounded" minOccurs="0" type="xs:string" /> | F3 |
| <xs:sequence> | |
| <xs:complexType> | |
| <xs:schema> | |

```
<?xml version='1.0' encoding='UTF-8' ?>
<person>
        <name>Fred Jones</name>
        <phone>+44306999012</phone>
        <phone>+447700987654</phone>
</person>
```

| fieldInstances | F1→F1.1 | | |
|---|---|---|---|
| fieldInstanceValues | F1.1→ | fieldInstances | F2→F2.1<br>F3→F3.1.F3.2 |
| | | fieldInstanceValues | |
| | | expression | |
| | F2.1→ | fieldInstances | |
| | | fieldInstanceValues | |
| | | expression | "Fred Jones" |
| | F3.1→ | fieldInstances | |
| | | fieldInstanceValues | |
| | | expression | "+44306999012" |
| | F3.2→ | fieldInstances | |
| | | fieldInstanceValues | |
| | | expression | "+44700987654" |
| expression | | | |

CONFORMING DATA STRUCTURE INSTANCES TO SCHEMA VERSIONS

FIELD OF THE INVENTION

The present invention relates generally to the field of schema conforming data structures, and more particularly to data structure instances conforming to evolving versions of a schema.

BACKGROUND OF THE INVENTION

When data is communicated between various parties, it is common to establish an understanding of the potential structure, interrelationships, and/or allowable forms of such data. This understanding may be captured and defined within a specification and/or schema. A schema is a way to define the structure, content, and to some extent, the semantics of data. With a defined schema, each party can create instances of data structures that conform to that schema and exchange them, such that others will be able to use that same schema to correctly interpret each instance. Schema languages include extensible markup language (XML) Schema (XSD), as a schema language for XML, data definition language (DDL), as a schema language for structured query language (SQL), or common business-oriented language (COBOL) copybook, as a schema language for COBOL. As a system evolves, additional schema versions may be created to support changing requirements for the system.

SUMMARY

Aspects of an embodiment of the present invention disclose a method, computer program product, and computing system for managing versions of a schema. A processor receives a first version of a schema. A processor generates an annotated version of the first version of the schema, wherein one or more fields of the annotated version of the first version of the schema each correspond to a distinct identifier. A processor receives a first instance conforming to the first version of the schema. A processor identifies one or more values of the first instance, wherein each value of the one or more values of the first instance corresponds to a field of the one or more fields. A processor assigns an identifier to at least one value of the one or more values of the first instance based on the distinct identifier corresponding to the field of the at least one value. A processor stores the at least one value of the one or more values of the first instance, such that the at least one value is associated with the assigned identifier.

BRIEF DESCRIPTION OF THE SEVERAL VIEWS OF THE DRAWINGS

FIG. 5A depicts an example annotated schema version, in accordance with an embodiment of the present invention.

FIG. 5B depicts an example instance data structure, in accordance with an embodiment of the present invention.

DETAILED DESCRIPTION

Embodiments of the present invention recognize that, as a system evolves, the data structures exchanged or otherwise shared, may also evolve. Schema versions may be updated to add, remove, or change data fields. Embodiments of the present invention recognize that, as schema versions change, instance data structures that conformed to older versions of the schema may not conform to newer schema versions. In one example, a data structure instance may be stored, with the intention of reuse, but when the time to reuse arrives, the data structure instance may be incompatible with the newer schema version. Embodiments of the present invention recognize that a method is required to enable the creation of data structure instances that conform to a variety of schema versions, from a single source of instance data.

The present invention will now be described in detail with reference to the Figures.

Figure 1:
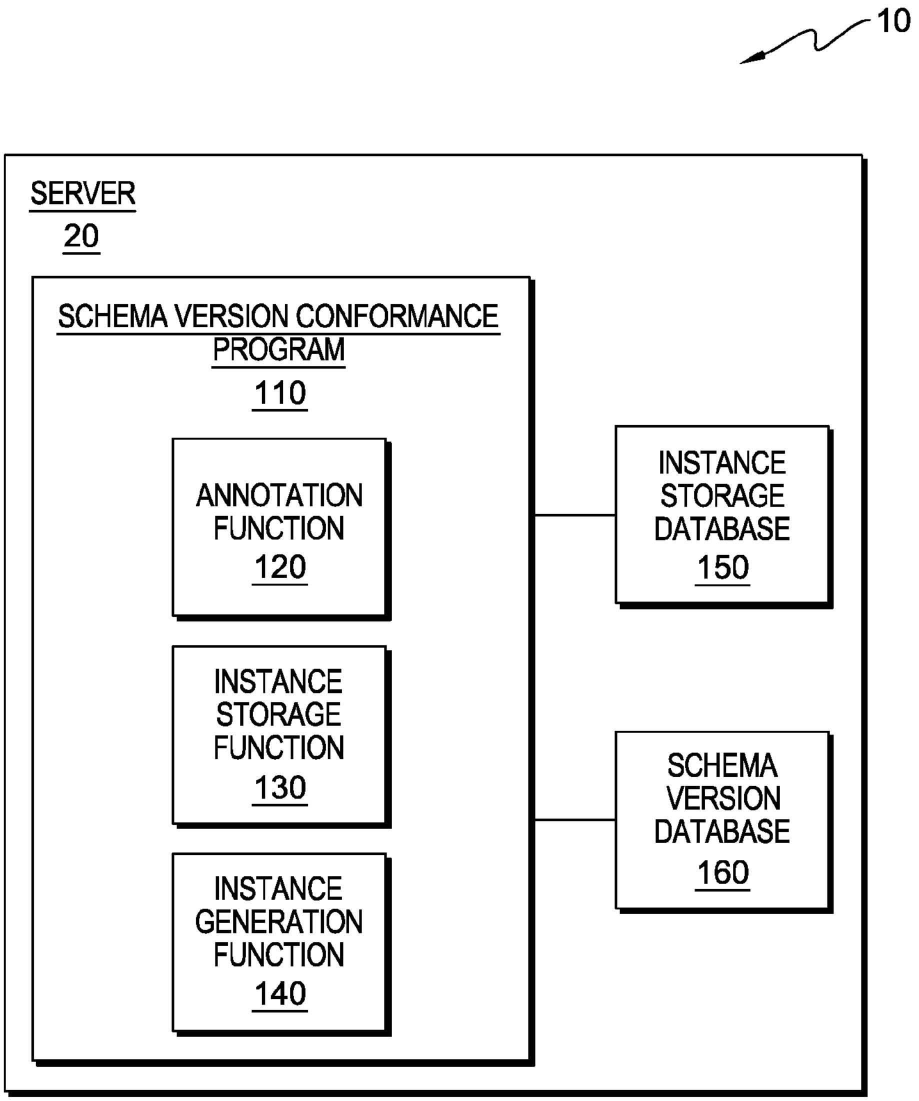
FIG. 1 depicts a diagram of a computing system, in accordance with one embodiment of the present invention.

FIG. 1 depicts a diagram of computing system 10, in accordance with one embodiment of the present invention. FIG. 1 provides only an illustration of one embodiment and does not imply any limitations with regard to the environments in which different embodiments may be implemented.

In the depicted embodiment, computing system 10 includes server 20. Computing system 10 may also include a network, servers, computing devices, or other devices not shown.

Server 20 may be a management server, a web server, or any other electronic device or computing system capable of processing program instructions, and receiving and sending data. In some embodiments, server 20 may be a laptop computer, tablet computer, netbook computer, personal computer (PC), a desktop computer, a personal digital assistant (PDA), a smart phone, or any programmable electronic device. In other embodiments, server 20 may represent a server computing system utilizing multiple computers as a server system, such as in a cloud computing environment. Server 20 contains schema version conformance program 110, annotation function 120, instance storage function 130, instance generation function 140, instance storage database 150, and schema version database 160. Server 20 may include components, as depicted and described in further detail with respect to FIG. 4.

Schema version conformance program 110 operates to annotate fields located within schema versions, store instance data in a version independent data structure, and generate instance data structures that conform to requested schema versions. A schema is a way to define the structure, content, and to some extent, the semantics of a document or data structure. A schema may include an extensible markup language (XML) schema, data definition language (DDL), COBOL copybook. In one embodiment, schema version conformance program 110 includes annotation function 120, instance storage function 130, and instance generation function 140. In one embodiment, schema version conformance program 110 resides on server 20. In other embodiments, schema version conformance program 110 may reside on another server or another computing device, provided schema version conformance program 110 has access to instance storage database 150 and schema version database 160.

Annotation function 120 operates to annotate received schema versions and assign field identifiers to logically different fields within a schema version. An annotated schema is a schema that has been annotated to include one or more field identifiers. Each field identifier may identify a logically distinct attribute or field in that version of the schema. For example, field identifiers may be assigned to each element and attribute definition. If additional schema versions have previously been annotated, annotation function 120 assigns field identifiers based on the prior annotations. Annotation function 120 also operates to store annotated schema versions. In some embodiments, annotation function 120 may provide, to a user, an indication of field identifiers associated with each field. In other embodiments, steps of annotation function 120 may be manually performed by a user. In one embodiment, annotation function 120 may store annotated schema versions to schema version database 160. In some embodiments, annotation function 120 is a function of schema version conformance program 110. In other embodiments, annotation function 120 may be a stand-alone schema annotation program, provided annotation function 120 has access to schema version database 160.

Schema version database 160 may be a repository that may be written and read by schema version conformance program 110, annotation function 120, instance storage function 130, and instance generation function 140. Annotated schemas versions may be stored to schema version database 160. In one embodiment, schema version database 160 resides on server 20. In other embodiments, schema version database 160 may reside on another server or another computing device, provided that schema version database 160 is accessible to schema version conformance program 110, annotation function 120, instance storage function 130, and instance generation function 140.

Instance storage function 130 operates to populate and store schema version independent data structures, hereinafter referred to as value structures, based on values of data structure instances and the corresponding fields associated with an annotated schema version. In one embodiment, instance storage function 130 may store value structures to instance storage database 150. In one embodiment, instance storage function 130 resides on server 20. In other embodiments, instance storage function 130 may reside on another server or computing device, provided that instance storage function 130 has access to instance storage database 150 and schema version database 160.

Instance storage database 150 may be a repository that may be written and read by schema version conformance program 110, instance storage function 130, and instance generation function 140. Value structures for data structure instances may be stored to instance storage database 150. In one embodiment, instance storage database 150 resides on server 20. In other embodiments, instance storage database 150 may reside on another server or another computing device, provided that instance storage database 150 is accessible to schema version conformance program 110, instance storage function 130, and instance generation function 140.

Instance generation function 140 operates to generate instance data structures that are compliant with specified schema versions. Instance generation function 140 may generate instance data structures using the value structure for the requested data, the annotated schema for the specified schema version. Instance generation function 140 may utilize a processing function associated with the specified schema version to create the required instance data structure. In one embodiment, instance generation function 140 resides on server 20. In other embodiments, instance generation function 140 may reside on another server or computing device, provided that instance generation function 140 has access to instance storage database 150 and schema version database 160.

Figure 2:
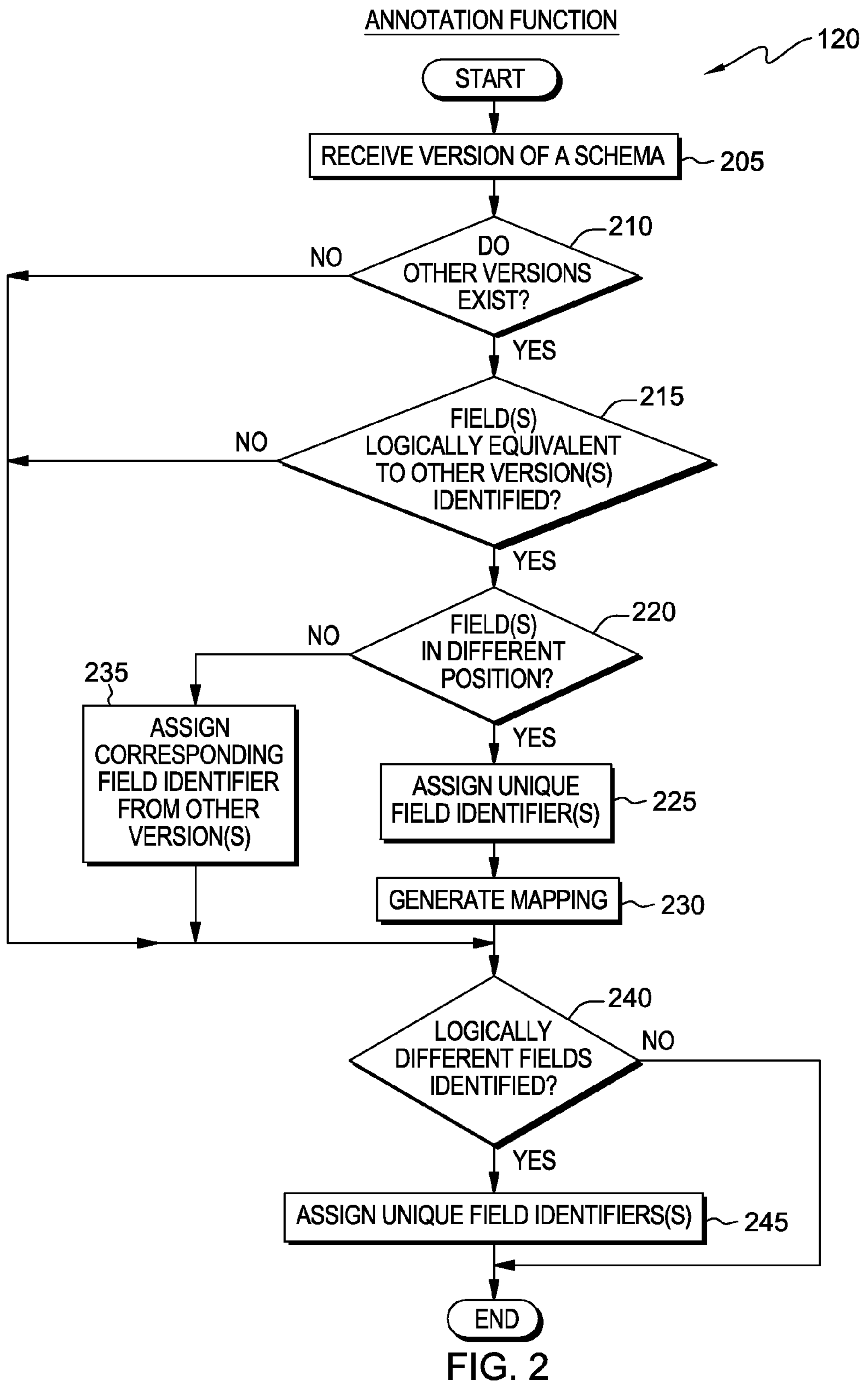
FIG. 2 depicts a flowchart of the steps of an annotation function executing within the computing system of FIG. 1, for annotating received schema versions, in accordance with an embodiment of the present invention.

FIG. 2 depicts a flowchart of the steps of annotation function 120, a function of schema version conformance program 110, executing within the computing system of FIG. 1, in accordance with an embodiment of the present invention. Annotation function 120 operates to receive, annotate, and store schema versions.

In one embodiment, initially, a user may write a schema. In some embodiments, the schema may be a new schema. In other embodiments, the schema may be a new version of a previous schema.

In step 205, annotation function 120 receives a version of a schema. In some embodiments, annotation function 120 may receive the version of the schema from a user accessing server 20 through a user interface (UI) (not shown). In other embodiments, annotation function 120 may receive the version of the schema from a user accessing annotation function 120 via a client computing device over a network (not shown). The received version of the schema may include the schema and, if applicable, a version associated with the schema.

In decision 210, annotation function 120 determines whether other annotated versions of the received schema exist. In some embodiments, annotation function 120 may access a database of previously stored and annotated schema versions, such as schema version database 160 to determine whether another version of the received schema exists. If annotation function 120 determines that no other annotated version(s) of the schema exists (decision 210, no branch), annotation function 120 proceeds to decision 240 (see below). In some embodiments, annotation function 120 may determine that no other annotated version(s) of the schema exists if the received version of the schema is the only version of the schema, as compared to other schemas and schema versions stored to schema version database 160.

If annotation function 120 determines that at least one other version of the schema does exist (decision 210, yes branch), annotation function 120 determines whether any field(s) in other existing annotated version(s) of the schema are logically equivalent to one or more fields in the received version of the schema (decision 215). A logically equivalent field may include a data field representing some type of data expected to be received, such as a phone number, address, favorite animal, or some other type of data. A logically equivalent field may also include a field specifying a data type definition for a variable. In some embodiments, annotation function 120 may determine that a field in an existing annotated version of the schema is logically equivalent to a field in the received version of the schema by comparing the different versions of the schema and identifying identical fields. In another embodiment, annotation function 120 may access a database (not shown) including tables indicating logically similar terms. In yet another embodiment, annotation function 120 uses text analytics to parse through schema versions and identify logically equivalent fields. Using natural language processing and at least one set of dictionaries and rules, annotation function 120 can perform text analytics on schema versions to identify logically equivalent fields. Text analytics can be performed using an Unstructured Information Management Architecture (UIMA) application configured to analyze unstructured information to discover patterns by processing plain text and identifying relations.

If annotation function 120 determines that no fields in the previously stored and annotated version(s) of the schema are logically equivalent to fields present in the received version of the schema (decision 215, no branch), annotation function 120 proceeds to decision 240 (see below). If annotation function 120 determines that one or more fields in a previously stored and annotated version of the schema is logically equivalent (decision 215, yes branch), for each such logically equivalent field, annotation function 120 determines if the field is in a different position within the schema, relative to the other fields in the schema (decision 220). Annotation function 120 may determine whether a field is located within a different position between versions by comparing the received version, and the field location within the received version, to the location of the logically equivalent field within the alternate version(s) of the schema.

If annotation function 120 determines that the fields are in logically similar positions (decision 220, no branch), annotation function 120 will assign a field identifier to the field that is equivalent to the corresponding field identifier assigned to the logically equivalent field of the previously annotated version of the schema (step 235). A field identifier is a tag, flag, or other indication applied to each logically different attribute or field of a schema. Field identifiers that are equivalent indicate logically equivalent fields that are located in the same position within schema versions, relative to other fields within each schema.

If annotation function 120 determines that the fields are in logically different positions (decision 220, yes branch), annotation function 120 assigns the field, located in the received version of the schema, a unique field identifier (step 225). A unique field identifier is a new field identifier, i.e., a field identifier that has not been previously assigned to another field in other versions of the schema.

In step 230, annotation function 120 generates a mapping at the schema level, i.e., across schema version, that links the logically equivalent fields identified in the received version of the schema and a previously annotated version. Such a mapping links a field, and its use in a given context in the received schema version to the logically equivalent field's use in context in the previously annotated schema version (s). In some embodiments, the mapping identifies an ordered list of field identifiers, for each respective logically equivalent field, wherein the list starts with a field identifier for a root element of the schema, and each subsequent field identifier annotation encountered as the schema is navigated to the field. A mapping may further indicate which versions of the schema were used to generate the mapping.

In decision 240, annotation function 120 determines whether, and in addition to the previous steps, logically different fields are identified in the received version of the schema, as compared to previously annotated schema versions. Annotated function 120 may determine if logically different fields have been identified according to the methods previously discussed with regards to decision 215. If annotation function 120 identifies no field that is logically different than all of the fields in previously annotated versions of the schema (decision 240, no branch), the function is complete.

If annotation function 120 determines one or more fields that are logically different than fields present in previously annotated versions of the schema (decision 240, yes branch), annotation function 120 assigns each logically different field a unique field identifier (step 245), in a manner similar to step 225.

In some embodiments, annotation function 120 stores each annotated schema version to a repository, such as schema version database 160, for by schema version conformance program 110, instance storage function 130, and instance generation function 140.

Figure 3:
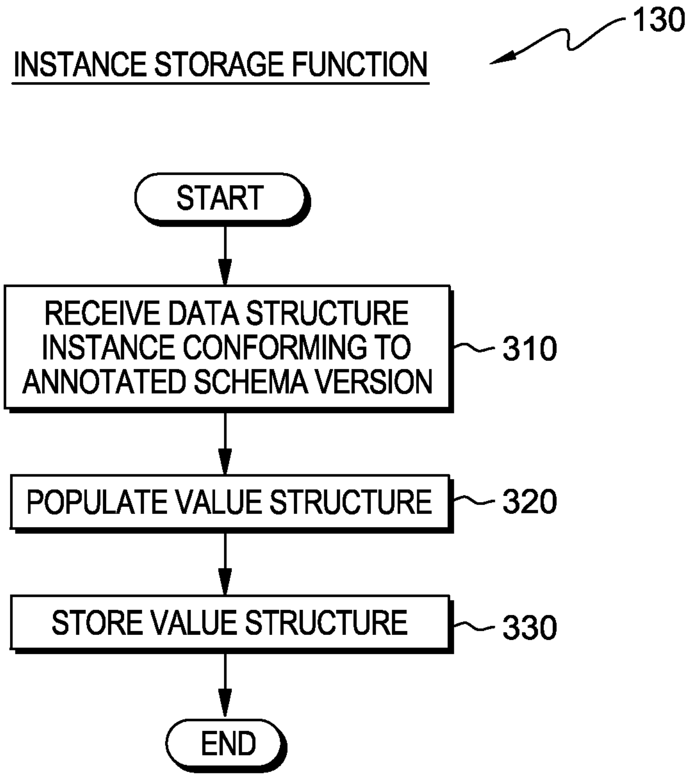
FIG. 3 depicts a flowchart of the steps of an instance storage function executing within the computing system of FIG. 1, for storing data structure instance data independent of the schema version, in accordance with an embodiment of the present invention.

FIG. 3 depicts a flowchart of the steps of instance storage function 130, a function of schema version conformance program 110, executing within the computing system of FIG. 1, in accordance with an embodiment of the present invention. Instance storage function 130 operates to populate and store schema version independent value structures for each received data structure instance conforming to a version of the schema.

In one embodiment, initially, a user may input information and create a data structure instance that conforms to an annotated version of a schema, such as an annotated version of a schema previously stored to schema version database 160.

In step 310, instance storage function 130 receives a data structure instance that conforms to an annotated schema version, such as an annotated schema version stored to schema version database 160. Instance storage function 130 may receive an instance data structure from a user at server 20 or another client computing device over a network (not shown).

Figure 5C:
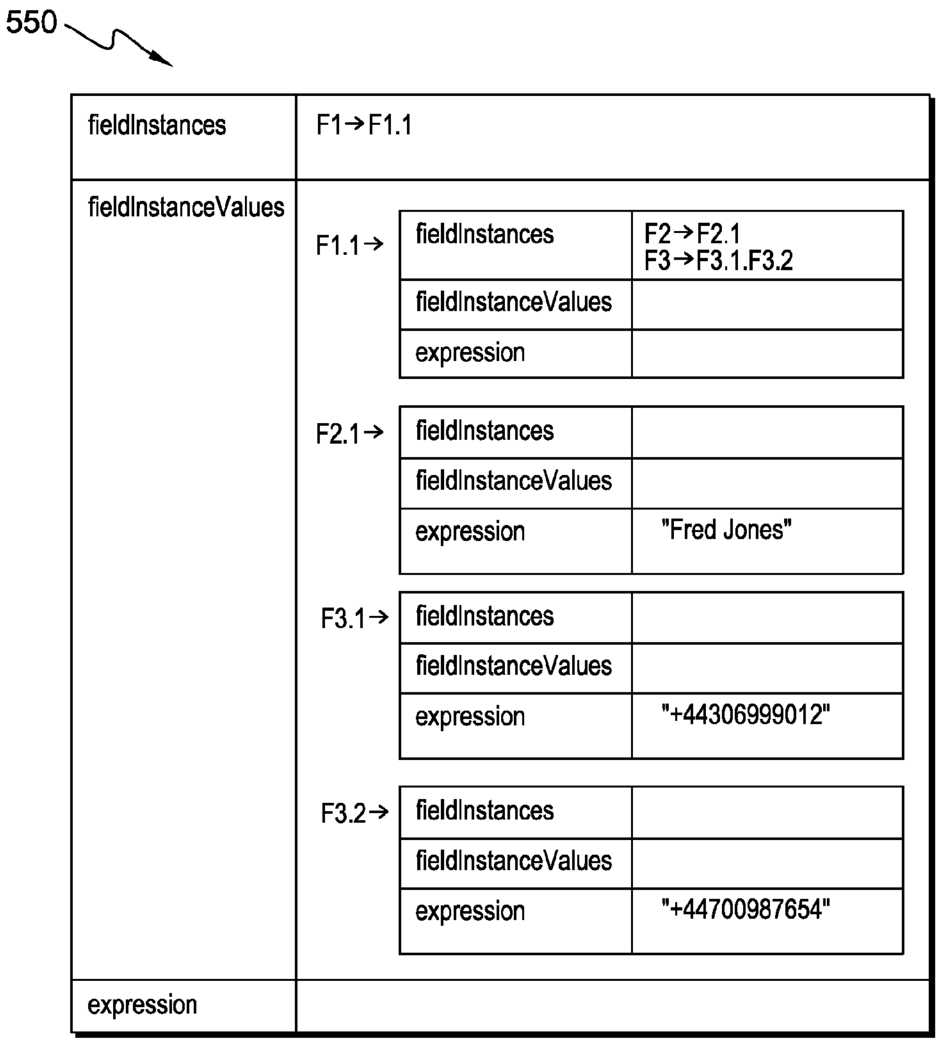
FIG. 5C depicts an example populated value structure, in accordance with an embodiment of the present invention.

In step 320, instance storage function 130 populates a value structure with data included in the data structure instance. A value structure is a schema independent recursive data structure. In some embodiments, a value structure stores data structure instance values in a map-like data structure that is keyed by field identifiers. Instance storage function 130 may populate a value structure for the data structure instance by accessing the annotated schema version that coincides with the version corresponding to the data structure instance. In some embodiments, the value structure maintains a list of instances of each field, and uniquely identifies each instance with a field instance identifier corresponding to a field identifier. By uniquely identifying each instance, instance storage function 130 may populate the value structure when values are repeated within a field assigned a field identifier. In general, a value structure maintains the values or mappings associated with field identifiers for the provided schema, such that alternate versions of the schema may access the values associated with the field identifiers, and a data structure instance may be generated which conforms to the alternate version of the schema. FIG. 5C depicts an example value structure, in accordance with one embodiment of the present invention.

In step 330, instance storage function 130 stores the value structure to a repository, such as instance storage database 150, for access by schema version conformance program 110 and instance storage database 150.

Figure 4:
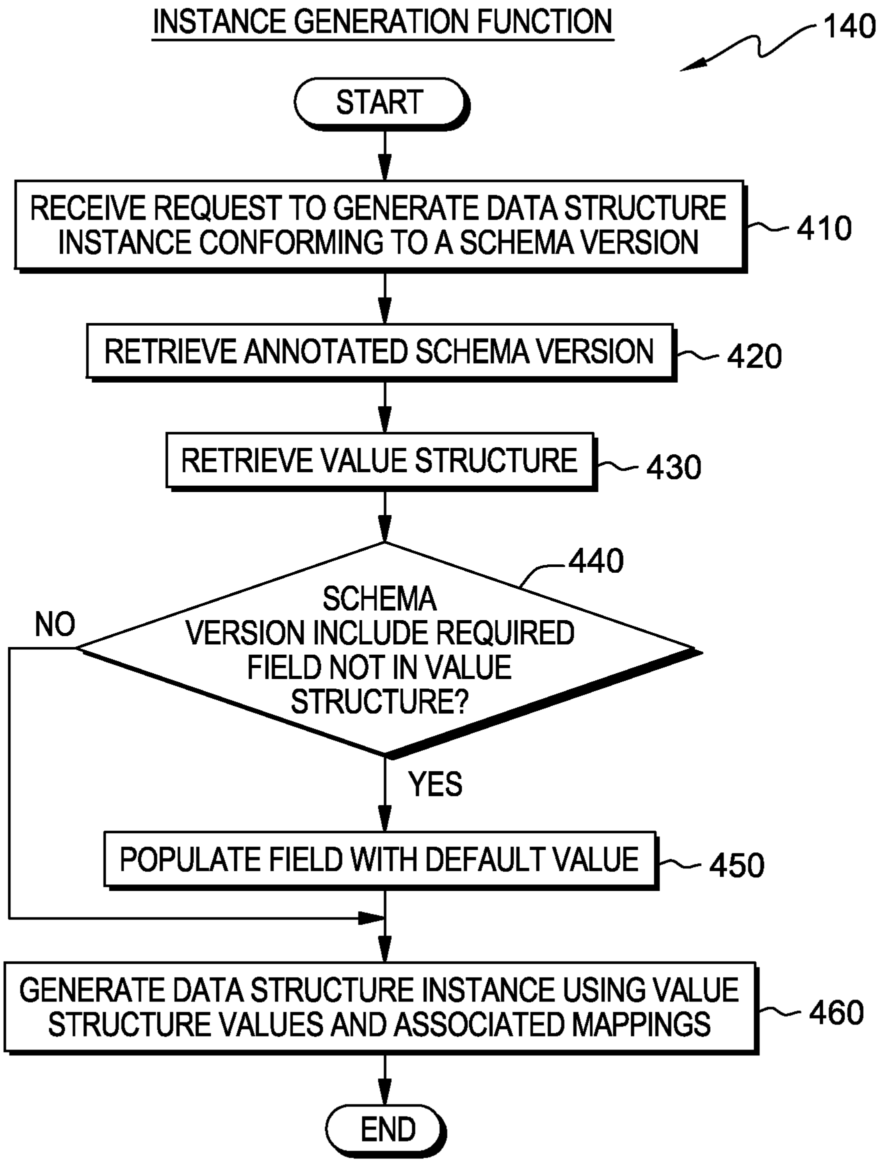
FIG. 4 depicts a flowchart of the steps of an instance generation function executing within the computing system of FIG. 1, for generating a data structure instance conforming to a schema version, in accordance with an embodiment of the present invention.

FIG. 4 depicts a flowchart of the steps of instance generation function 140, a function of schema version conformance program 110, executing within the computing system of FIG. 1, in accordance with an embodiment of the present invention. Instance generation function 140 operates to create data structure instances conforming to a schema version, using a populated value structure and an annotated version of the schema version.

In step 410, instance generation function 140 receives a request to generate a data structure instance conforming to a specified version of a schema. The request may include the necessary schema version to conform to, and the value structure corresponding to the original data structure instance. In one embodiment, the request is generated by a user at server 20 or another computing device not shown. In other embodiments, a request may be generated by an application or program communicating with schema version conformance program 110 and/or instance generation function 140. In still other embodiments, the a request may be generated by schema version conformance program 110 in response to a user attempt to communicate with another system or program operating with a different schema version.

In step 420, instance generation function 140 retrieves the applicable annotated schema version, based on the schema version necessary to fulfill the request. In some embodiments, instance generation function 140 may retrieve the annotated schema version from a repository, such as schema version database 160.

In step 430, instance generation function 140 retrieves the applicable value structure corresponding to the data required to populate the data structure instance. In some embodiments, instance generation function 140 may retrieve the value structure from a repository, such as instance storage database 150.

In decision 440, instance generation function 140 determines whether the schema version required includes a required field not present in the value structure corresponding to the data required to populate the data structure instance. A required field is a field in a schema version that is required. Typically, the schema version will provide a default value that should be used in case there is no value associated with the required field. In some embodiments, a default value for a required field may be provided by a user, such as when the particular schema language requiring the required field does not support default values, or if the user has more information about what value should be included in the required field. In some embodiments, instance generation function 140 will determine whether the value structure includes a required field for the value structure by comparing the field identifiers associated with the schema version, as detailed in the annotated schema version, to the populated value structure corresponding to the required data. If the annotated schema version includes required fields corresponding to field identifiers that do not have associated values stored within the populated value structure, instance generation function 140 may determine that a required field is not present in the value structure (decision 440, no branch). In some embodiments, instance generation function 140 will also determine whether the value structure includes a required field for the value structure by accessing the generated mappings (see FIG. 2) to determine the presence of values associated with required fields.

If instance generation function 140 determines that the schema version includes one or more required fields not present, i.e., without associated values, in the value structure (decision 440, yes branch), instance generation function 140 populates each field with the default value associated with that field (step 450). As previously mentioned, a schema version may indicate a default value to be used when no actual value for a field is present. In one embodiment, instance generation function 140 may populate the value structure itself with additional fields that include the default values. In another embodiment, instance generation function 140 may populate the data structure instance as it is generated (see step 460).

In step 460, instance generation function 140 generates the data structure instance that conforms to the requested schema version using the value structure for the data, the annotated version of the requested schema, and any associated mappings. In general, the information for the required schema will be populated using the values stored in the value structure and their associated field identifier instances by comparing the field identifier instances to matching field identifiers located on the annotated version of the requested schema. A processing function may be created to generate data structure instances for each schema version such that data structure instances complying with the schema version may be generated from a value structure created from a data structure instance of another schema version. As the schema version is being navigated and a data structure instance is being created, instance generation function 140 considers the field under context, as definable by a field path starting with the field identifier corresponding to a root element of the schema. The root element identifies which version of which data structure is to be produced. Embodiments of instance generation function 140 consider the mappings generated by annotation function 120. If the field path for a current field under consideration can be mapped to another field path, or target field path, as specified in the desired schema version, then the target field path should be used when consulting the value structure for value data.

FIGS. 5A-5C depict an example use-case scenario of schema version conformance program 110 and its functions, in accordance with one embodiment of the present invention. While FIGS. 5A-5C include specifically XML as the data interchange standard and XSD as the schema language, this is merely an example, and embodiments of the present invention may be applied and/or used with other data types and schema languages.

FIG. 5A depicts an example annotated version of a schema, in accordance with an embodiment of the present invention. In the depicted illustration, annotated schema 510 is a version of a schema that annotation function 120 has annotated and stored to a repository, such as schema version database 160. In the depicted illustration schema 515 represents the particular version of the schema. Field identifiers 520 have been assigned to schema 515 via user input or annotation function 120. In some embodiments, annotated schema 510 may be presented to a user, along with a list of previously stored field identifiers and their associated schema fields, such that a user may be able to reconcile any inaccuracy resulting from the use of a function for annotating the schema, such as annotation function 120.

FIG. 5B depicts an example data structure instance, in accordance with an embodiment of the present invention. As depicted, data structure instance 530 conforms to schema 515 (see FIG. 5A).

FIG. 5C depicts an example of a populated value structure, as created by instance storage function 130, in accordance with an embodiment of the present invention. As previously mentioned, populated value structures store data in a form that is independent from the particular schema version associated with the data structure instance from which the data was obtained. As depicted, value structure 550 is a value structure populated by using the values from data structure instance 530 and annotated schema 510, according to methods previously described. Value structure 550 includes field identifier instances (F1.1, F2.1, F3.1, etc.) corresponding field identifiers (F1, F2, etc.) which match field identifiers 520 (see FIG. 5A). Values have been extracted from data structure instance 530 according to annotated schema 510, and stored to value structure 550. In value structure 550, such values include "Fred Jones," "+44306999012," "+447700987654," and F2→F2.1. Value structure 550 includes "fieldInstances" "fieldInstanceValues" and "expression" as features of the data structure. "expression" is used to store a scalar value, such as "Fred Jones." "fieldInstances" is a map structure storing an ordered list of field instance identifiers representing instances of a given field, keyed against an associated field identifier. "fieldInstanceValues" represents a map structure storing value structures keyed against field instance identifiers. In other embodiments, value structures, such as value structure 550 may comprise a different data structure, provided context and value information may be stored for retrieval and use by instance generation function 140.

Figure 6:
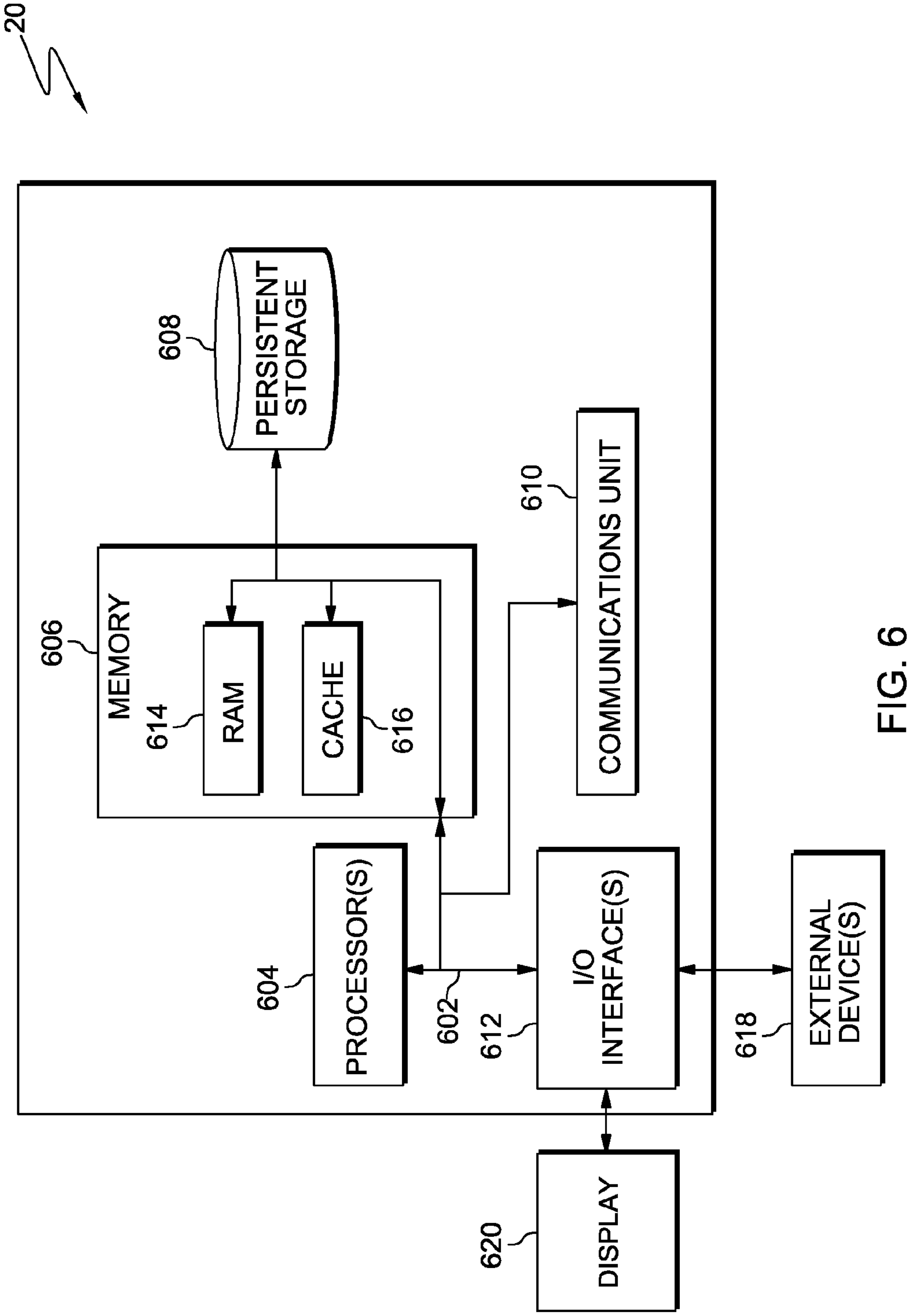
FIG. 6 depicts a block diagram of components of the server, in accordance with one embodiment of the present invention.

FIG. 6 depicts a block diagram of components of server 20, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Server 20 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM) 614 and cache memory 616. In general, memory 606 can include any suitable volatile or non-volatile computer readable storage media.

Schema version conformance program 110, annotation function 120, instance storage function 130, instance generation function 140, instance storage database 150, and schema version database 160 are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Schema version conformance program 110, annotation function 120, instance storage function 130, instance generation function 140, instance storage database 150, and schema version database 160 may be downloaded to persistent storage 608 through communications unit 610.

I/O interface(s) 612 allows for input and output of data with other devices that may be connected to server computer 20. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention, e.g., schema version conformance program 110, annotation function 120, instance storage function 130, instance generation function 140, instance storage database 150, and schema version database 160, can be stored on such portable computer readable storage media and can be loaded onto persistent storage 608 via I/O interface(s) 612. I/O interface (s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing versions of a schema, the method comprising:

receiving a first version of a schema;

generating, by one or more processors, an annotated version of the first version of the schema, wherein one or more fields of the annotated version of the first version of the schema each correspond to a distinct identifier;

receiving a first instance conforming to the first version of the schema;

identifying, by one or more processors, one or more values of the first instance, wherein each value of the one or more values of the first instance corresponds to a field of the one or more fields;

assigning, by one or more processors, an identifier to at least one value of the one or more values of the first instance based on the distinct identifier corresponding to the field of the at least one value; and storing, by one or more processors, the at least one value of the one or more values of the first instance, such that the at least one value is associated with the assigned identifier.

2. The method of claim 1, wherein the step of generating, by one or more processors, an annotated version of the first version of the schema comprises:

identifying, by one or more processors, one or more logically different fields of the first version of the schema; and assigning, by one or more processors, a distinct identifier to each field of the one or more logically different fields.

3. The method of claim 1, further comprising:

receiving a second version of the schema;

identifying, by one or more processors, a first field of the second version of the schema, wherein the first field is logically equivalent to a field of the annotated version of the first version of the schema associated with a first identifier;

assigning, by one or more processors, the first identifier to the first field; and generating, by one or more processors, an annotated version of the second version of the schema based on at least the first field and the assigned first identifier.

4. The method of claim 1, further comprising:

receiving a second version of the schema;

identifying, by one or more processors, a first field of the second version of the schema, wherein the first field is logically equivalent to a field of the annotated version of the first version of the schema associated with a first identifier, and wherein the first field is in a different position within the second version of the schema as compared to the field of the annotated version of the first version of the schema;

assigning, by one or more processors, a second identifier to the first field;

mapping, by one or more processors, the second identifier to the first identifier; and generating, by one or more processors, an annotated version of the second version of the schema based on at least the first field, the second identifier, and the mapping.

5. The method of claim 1, further comprising:

receiving a request to generate a second instance conforming to a second version of the schema using the one or more values of the first instance;

retrieving, by one or more processors, an annotated version of the second version of the schema, wherein the annotated version of the second version of the schema includes at least the assigned identifier, wherein the assigned identifier is further associated with a field of the annotated version of the second version of the schema; and generating, by one or more processors, the second instance, using the at least one value of the one or more values of the first instance based on at least the assigned identifier, wherein the second instance conforms to the second version of the schema.

6. The method of claim 5, wherein the step of generating the second instance further comprises:

identifying, by one or more processors, a required field of the annotated version of the second version of the schema, wherein the required field is associated with a first identifier;

determining, by one or more processors, no value of the one or more values of the first instance is associated with the first identifier in the one or more values of the first instance; and populating, by one or more processors, the required field of the second version of the schema with a default value.

7. The method of claim 1, wherein the schema is an XML schema.

* * * * *